Jan. 24, 1967  G. E. FOGLE  3,299,856
ANIMAL HOLDING AND SORTING PEN
Filed March 21, 1966  3 Sheets-Sheet 1
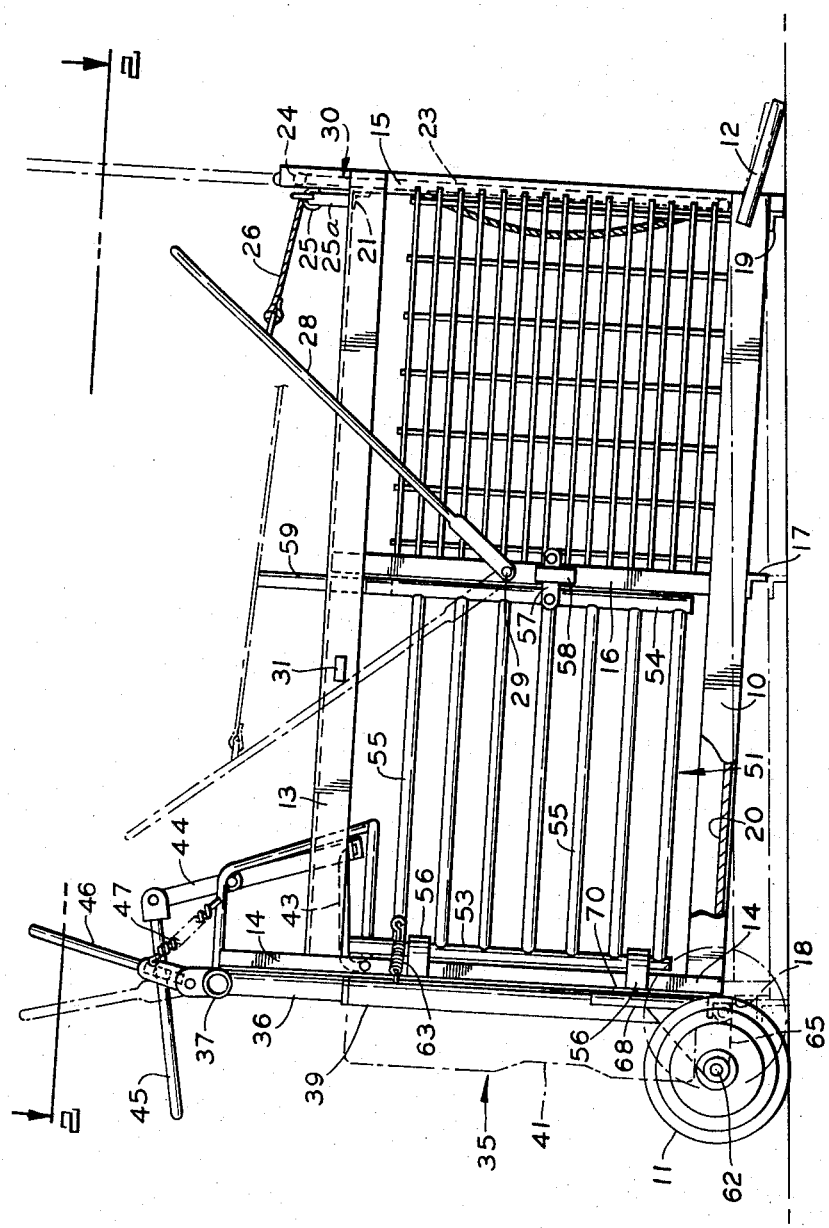
INVENTOR.
GENE E. FOGLE
BY
MAHONEY, MILLER & RAMBO
BY
ATTORNEYS

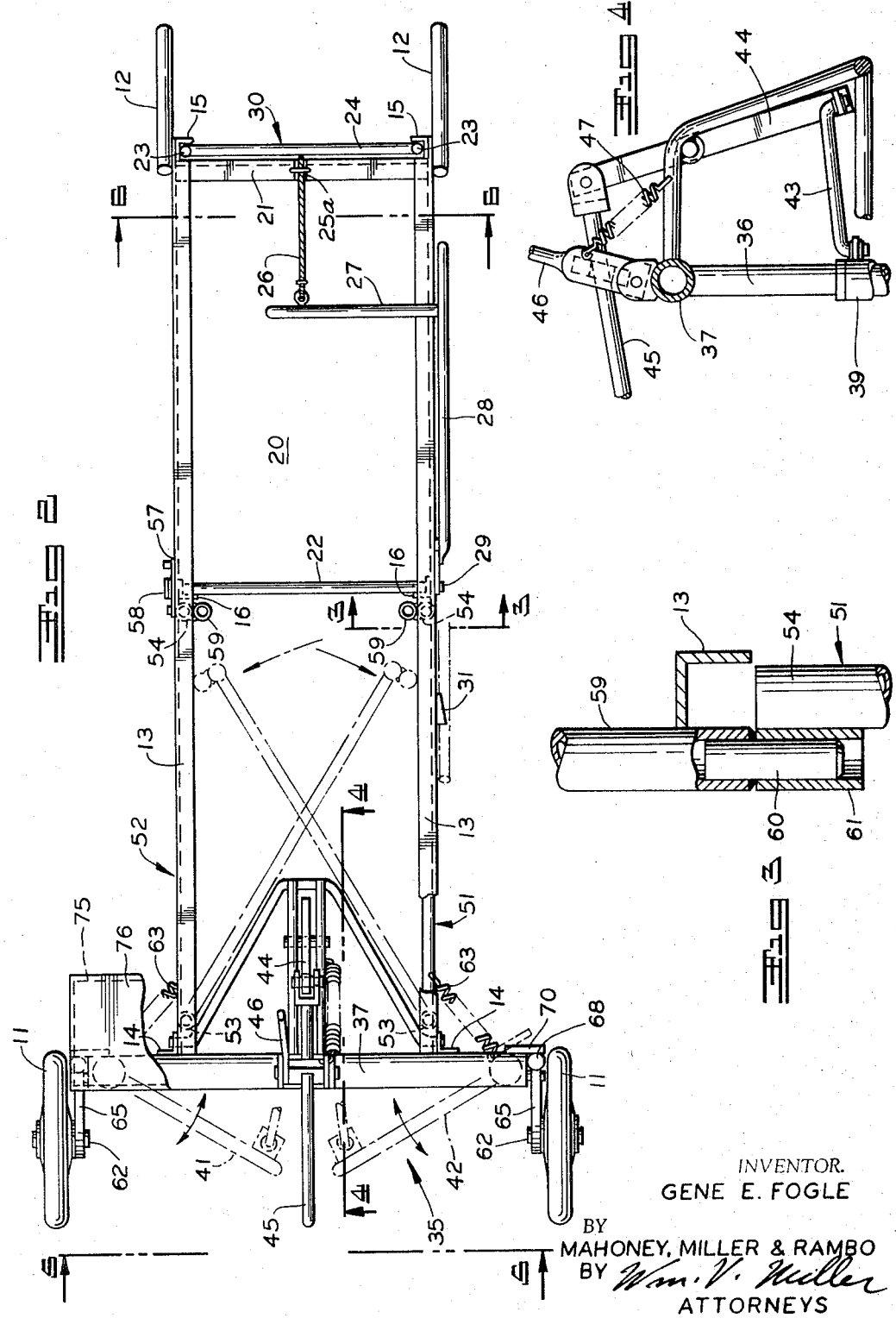

Jan. 24, 1967 G. E. FOGLE 3,299,856
ANIMAL HOLDING AND SORTING PEN
Filed March 21, 1966 3 Sheets-Sheet 3
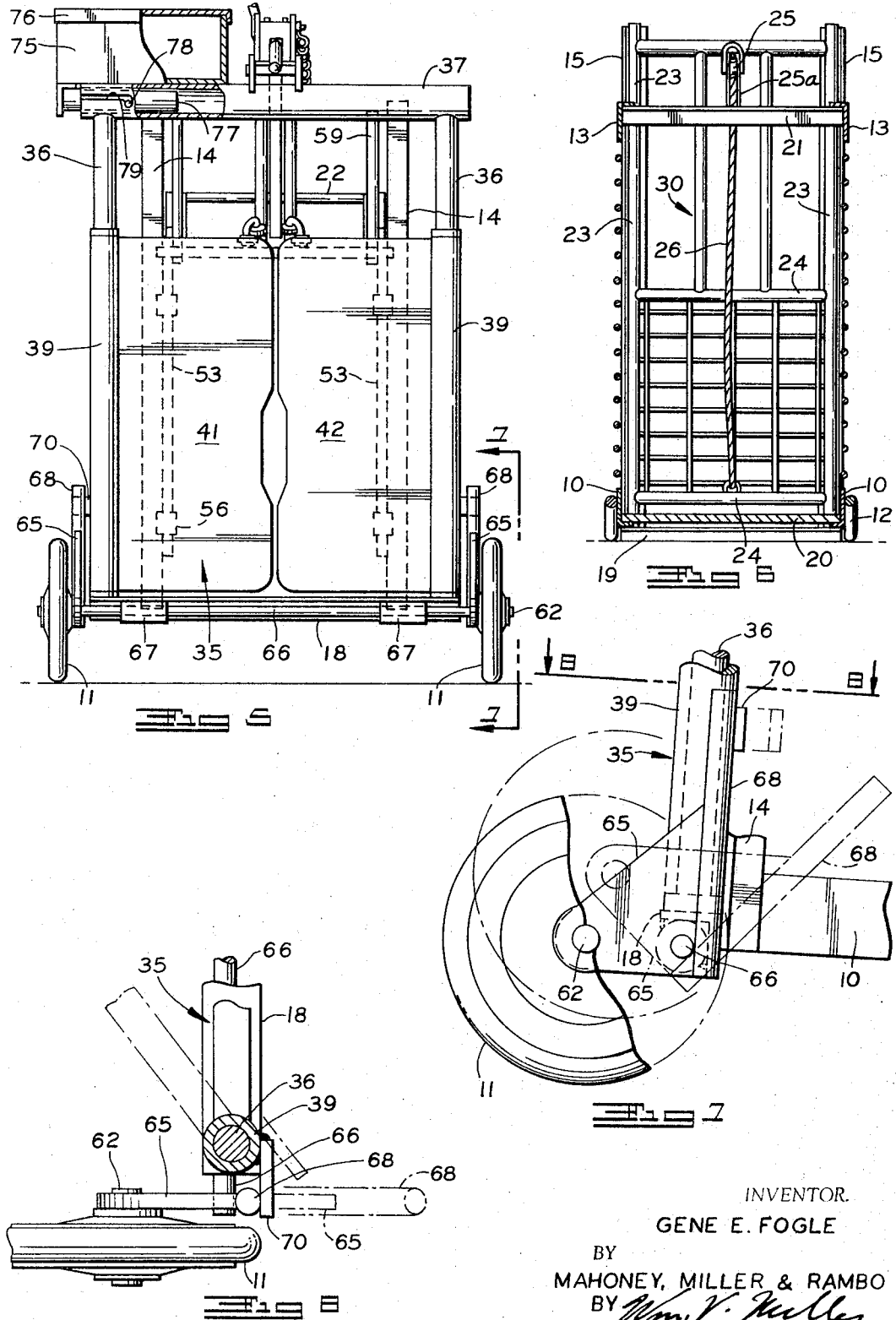
INVENTOR.
GENE E. FOGLE
BY
MAHONEY, MILLER & RAMBO
BY
ATTORNEYS

United States Patent Office 3,299,856
Patented Jan. 24, 1967

3,299,856
ANIMAL HOLDING AND SORTING PEN
Gene E. Fogle, Greensburg, Ind., assignor to Martin
Mfg. Co., a corporation of Ohio
Filed Mar. 21, 1966, Ser. No. 535,771
10 Claims. (Cl. 119—99)

This application is a continuation-in-part of my copending application Ser. No. 461,453 filed June 4, 1965, now abandoned.

This invention relates to an animal holding and sorting pen. It has to do, more particularly with a pen for receiving an animal and which is provided with an animal head catch gate so that the animal can be held in the pen for certain operations as well as other gates so that the animals successively passing through the pen can be separated into separate groups, the pen becoming, in effect, a sorting chute.

The pen of this invention is preferably used with an animal head cattle gate of the type disclosed in the patent to McMurray et al., No. 2,801,612, issued August 6, 1957, but it can be used with other types of catch gates. The pen preferably is elongated with wheels at one end adjustable between supporting and nonsupporting positions and handles at the other end so that when the wheels are locked in operative supporting position the pen is readily portable and can be handled by one man. With the wheels in nonsupporting position the pen will tend to stay in a fixed location. The pen has a sliding door at the entrance end, which may be held in either position, and the catch gate located at the opposite end which will, at times, be the exit end. The pen has reticulate or network walls so that when an animal is disposed therein and is gripped by the catch gate, ready access may be had to the animal from the exterior of the pen to perform various operations or treatment on the animal and bars may be inserted transversely to hold the animal in selected positions. The pen is further provided with opposed side gates between the entrance gate and the catch gate, which are selectively movable in such a manner that an animal entering the pen may be directed to one side or the other or the gates may, by simple adjustments, be swung to completely out-of-the-way positions. Also, at times, the catch gate may be opened with the side gates closed to direct the animal forwardly. Thus, the animals passing successively through the pen may be sorted into various groups.

Other objects and advantages will appear from the accompanying drawings, and the following description and claims.

In the accompanying drawings there is illustrated a preferred embodiment of this present invention.

In these drawings:

FIGURE 1 is a side elevational view, partly cut away, of the pen.

FIGURE 2 is a top plan view taken from the position indicated at line 2—2 of FIGURE 1.

FIGURE 3 is an enlarged vertical transverse sectional view along line 3—3 of FIGURE 2.

FIGURE 4 is an enlarged vertical longitudinal sectional view taken along line 4—4 of FIGURE 2.

FIGURE 5 is a front end, elevational view, partly broken away, taken from the position indicated at line 5—5 of FIGURE 2.

FIGURE 6 is a transverse sectional view taken along line 6—6 of FIGURE 2.

FIGURE 7 is an enlarged fragmentary and schematic side elevational view taken from the position indicated by the line 7—7 of FIGURE 2.

FIGURE 8 is a horizontal sectional view taken along line 8—8 of FIGURE 7.

With particular reference to the drawings, I have illustrated the invention generally in FIGURE 1 as an animal holding and sorting pen which is portable so that it can be moved readily from place-to-place, being supported at one end at a lower corner by means of a pair of wheels 11. These wheels are movably mounted for adjustment between a lowered operative supporting position and a raised inoperative nonsupporting position, as will be explained later. Also, means is provided for locking them in lowered supporting position. The pen includes the lower longitudinally extending, laterally spaced, parallel frame members 10 (FIGURES 1 and 6) which are preferably in the form of inturned angle members. At their rear ends, the frame members are provided with rearwardly extending handles 12 (FIGURES 1, 2 and 6) which are rigidly secured to the frame members and by means of which the chute may be lifted at its rear end and trundled about on the wheels 11 when they are in supporting position, as shown in full lines in FIGURE 1. Upper main frame members 13, similar to the members 10, are provided in longitudinally extending, laterally spaced relationship in a horizontal plane parallel to that of the lower members 10. They are supported in the desired vertical position by means of a pair of forward posts 14, preferably angle members, and a pair of rear posts 15, also preferably angle members. Additional similar intermediate posts 16 (FIGURES 1 and 2) are provided between the lower frame members 10 and the upper frame members 13. A transverse brace 17, preferably in the form of an angle iron, is connected between the members 10 below the lower ends of the intermediate posts 16. A transverse brace 18 (FIGURE 5) is also provided at the forward ends of the members 10 below the posts 14 and a transverse brace 19 (FIGURES 1 and 3) is provided at the rear ends of the members 10 below the posts 15. A floor plate or board 20 is provided between the members 10 and is supported thereby. A transverse intermediate brace 22 (FIGURE 2) is provided between the upper frame members 13 at the upper ends of the posts 16 and a transverse brace and support 21 is provided between the rear ends of the upper members 13 just ahead of the rear upright posts 15. However, no brace is provided between the forward ends of the members 13.

The rear or inlet end of the chute is provided with a vertically slidable gate 30 (FIGURES 1, 2 and 6) of reticulate form. This gate includes the vertical side members 23 which may be of pipe or the like joined by similar transverse braces 24 with the space between the members 23 filled with suitable grid-like wire mesh and bars. The gate 30 is positioned for sliding vertically in the guides formed by the angle posts 15 and is kept between the posts by the forwardly spaced transverse member 21 and the gate-operating means. The gate is raised by means of a cable 26 which passes rearwardly and downwardly over a pulley 25 (FIGURES 1 and 6) carried by a bracket 25a upstanding from the member 21 midway of its ends and which is anchored to the cross brace 24 at the lower end of the gate midway of its width. The forward end of this cable is connected to an inwardly extending rod 27 (FIGURE 2) carried by an actuating hand lever 28 which has its lower end pivoted at 29 (FIGURE 1) to one of the intermediate posts 16 about the midpoint of its height. A wedge lock 31 is provided on the adjacent upper frame member 13 and as the lever 28 swings forwardly, it will contact the wedge and will be deflected outwardly until it passes the wedge and snaps behind the blunt end of the wedge, as indicated in broken lines in FIGURES 1 and 2. Thus, it will be apparent that the inlet gate 30 will normally drop down to closed position but can be raised by the hand lever 28 when desired to permit entrance of an animal into the chute. It will be locked automatically in raised position until the lever 28 is released from the wedge 31 by forcing it outwardly, then the gate can drop by gravity.

The opposite or forward end of the chute is provided with the catch gate 35 which preferably is the type disclosed in said Patent No. 2,801,612. It is carried by an upright framework of rectangular form (FIGURE 5) made up of a pair of laterally spaced upright parallel tubes 36 which are held in spaced relationship by means of an upper tubular brace 37 and the lower angle brace 18 which extend transversely of and are rigidly secured to the forward posts 14. A pair of gates 41 and 42 are provided with indented gripping inner vertical edges which meet at the center line of the gate and have vertical hinge sleeves 39 and the outer edges rotatably mounted on the respective tube members 36 which are laterally beyond the sides of the main part of the chute. Positioning means like that disclosed in said patent is provided for regulating the positions of the gates 41 and 42. This positioning means includes links 43 which are pivotally connected to the gates 41 and 42 (FIGURES 2 and 4) and to a swingable actuating arm 44 which, in turn, is pivotally connected to a grip bar 45 that extends through a gripping unit 46 that includes a biasing spring 47. This structure functions substantially like that disclosed in said patent to permit the animal to spread the gates 41 and 42 to position its head therebetween but to prevent withdrawal therefrom.

The two vertical longitudinal sides of the pen are of reticulate or skeletal construction to permit ready access to any animal in the pen. The rear section of each side of the pen may be a fixed grid-like structure which extends between the intermediate post 16 and the rear post 15 and vertically between the upper and lower members 13 and 10. This grid provides opposed sockets through which bars may be passed transversely through the pen so as to aid in holding an animal contained therein in selected positions to facilitate treatment. However, the front section of the sides are provided, respectively, by the hinged gates 51 and 52 which are of identical construction.

Each gate, as shown in FIGURES 1 and 2, is preferably made of tubular bars and includes the front vertical member 53 and the rear vertical member 54 with the vertically spaced horizontal members 55 extending therebetween. Each gate is positioned between the forward post 14 and the intermediate post 16 (FIGURE 1) at that particular side. Its forward edge is hinged by hinges 56 to the adjacent post 14 and its rear edge is provided with a vertically swingable latch bar 57 which cooperates with a keeper 58 on the outer side of the adjacent post 16. A removable handle and stop 59 extends upwardly from the rear vertical member 54, being secured to the inner side thereof so that when it strikes the upper frame member 13, the gate is positioned outwardly between the posts 14 and 16 and the latch bar 57 can be swung into the keeper 58. A tension spring 63, connected to the gate and to the associated hinge sleeve 39 keeps the gate in its outer closed position with the stop 59 contacting the member 13 (FIGURE 3). Thus, normally the gates 51 and 52 are both closed. However, either one, as indicated in broken lines in FIGURE 2, may be swung inwardly across the pen into contact with the gate at the other side. This will open the selected side of the pen and simultaneously block access to the catch gate 35. Thus, the animal will be directed laterally from the selected side of the chute as it enters through the inlet gate 30 which will be opened at this time. If desirable to move either of the gates 51 or 52 completely out of the way, the handle stop 59 of that gate may be removed. It will be noted in FIGURE 3 that the handle 59 carries a depending pin 60 which removably fits into an upwardly opening socket 61 carried by the upper end of the rear vertical gate member 54. When the handle 59 is removed, the gate may be swung outwardly beneath the associated frame member 13. This will permit either of the gates 51 or 52 to be swung outwardly outside the pen and forwardly of the associated gate opening, to be out of the way or to be used in directing the animal outwardly of the pen.

The pen may be used for operating on or treating animals, in which case the gate 30 will first be opened to permit the animal to reach the catch gate 35 where it will be held and then the gate 30 will be allowed to drop into closed position. If the animals are to be separated, some may be allowed to proceed through the catch gate 35 as one group, and others may be separated into one of two other groups by selectively opening the gates 51 or 52 inwardly and directing the animals to one side or the other without permitting them to reach the catch gate 35. When one gate 51 or 52 is opened, it engages and holds the other in locked position, even though at this instant latch 57 may not be engaged, because the stop 59 of the closed gate is inwardly of and contacting the associated upper frame member 13. The gates 51 and 52, normally, can only swing inwardly because of this stop arrangement but by removing the stop handles 59 they may be swung outwardly. Each gate 51 or 52, by swinging inwardly, not only locks the other of such gates in position but prevents access by the animal, entering through the gate 30, to the catch gate 35. The gates 51 and 52 are automatically returned to their normal outer position by the springs 63 and at this time the stops 59 limit the outward positions of the gates to close the sides of the pen.

As previously indicated, the wheels 11 are mounted for movement between supporting and nonsupporting positions and the wheel-mounting arrangement is shown best in FIGURES 1, 2, 5, 7 and 8. Each wheel is carried by an axle 62 mounted on the forward angle of a triangular bracket 65 which, in effect, is a bell crank. Each wheel-supporting bracket 65 is keyed at its rear and lower angle to the outer end of a pivot rod 66. The rod 66 extends transversely below the member 18 and is rotatably mounted thereon by means of the laterally spaced bearing sleeves 67 carried thereby. Each bell crank bracket 65 carries a locking arm 68 at its inner edge. Since the brackets 65 are eccentrically mounted, the wheels 11 will tend to swing upwardly when the weight of the pen is applied thereto unless locked in position. They will normally swing into the broken line positions indicated in FIGURES 7 and 8, at which time the locking arms 68 will be swung rearwardly, as indicated in broken lines. However, if the arms 68 are swung forwardly into upright positions, the wheels will be swung downwardly about the axis of the pivot 66 into pen-supporting position, as indicated by the full lines in FIGURES 1, 2, 5, 7, and 8.

Means is provided for locking the arms 68 in these upright positions and this means is actuated by moving the catch gate 35 to the animal holding position indicated by the broken lines in FIGURE 2 where it will be held by the gripping unit 46. This means comprises a locking lug 70 carried by each hinge sleeve 39 adjacent its lower end at a position which will be at a level adjacent the upper end of the cooperating lever arm 68 when it is moved into engagement therewith.

When the sections 41 and 42 of the gate 35 are swung outwardly open, the lugs 70 carried by the respective hinge sleeves 39 thereof swing inwardly into noninterfering relationship with the wheel locking arms 68 and permit them to swing rearwardly to permit the wheels to swing upwardly and the pen to rest on the ground. The angle members 17, 18 and 19 will provide cleats at this time which will dig into the ground and prevent sliding movement of the pen during use. However, as soon as it is desired to move the pen, the wheels are raised by swinging the lever arms 68 forwardly and upwardly, and locking them in such positions by moving the gate sections 41 and 42 into their animal-engaging positions shown by broken lines in FIGURE 2. They will be held in this position by the gripping unit 46 to hold the wheels 11 downwardly in supporting position. Then one man can handle the pen by engaging the handles 12 and wheeling it around on the forward wheels 11 like a hand truck. To release the wheels, it is merely necessary to swing the gate sections 41 and 42 outwardly and move the lugs 70 out of engagement with the wheel-locking lever arms 68. Then the wheels 11 will swing upwardly and forwardly automatically and the pen will settle on the ground.

For holding supplies which may be used in treating the animals, a box 75 with a removable lid 76 may be provided and be removably mounted on the front gate upper transverse support 37, as shown in FIGURE 5. This box may be carried by a mounting sleeve 77 which telescopes into one of the ends of the tubular support 37 and which is provided with a radial pin 78 that cooperates with a bayonet slot 79 extending inwardly into the member 37 from its outer extremity. By a simple twisting and axial movement, the box may be locked in position on the support 37 or be removed therefrom.

It will be apparent from the above that this invention provides an animal sorting pen which can be readily handled by one man. The pen is readily portable and the wheels can be moved easily by one man into supporting position by swinging the locking arms 68 upwardly and moving the catch door sections 41 and 42 towards closed position. With the wheels in supporting position, the pen may be trundled from one place to the other by one man handling the handles 12. When the pen reaches the proper position, the wheels will automatically swing upwardly and permit the pen to rest on the ground if the gripping unit 46 is released. The pen will be firmly held on the ground in a fixed position by the cleats 17, 18 and 19 even though animals bump it during passage therethrough or try to release themselves from the catch gate. The catch gate can now be operated to grip an animal without the lugs 70 contacting the arms 68. One man can operate the tail gate by means of the handle 28 from the front position where he will ordinarily be located adjacent the catch gate control lever 45. Furthermore, from the one side of the pen he may open either of the side gates 51 or 52 to properly direct the animals. These gates are normally spring returned to a longitudinal position in the side of the pen. However, as indicated, they may be moved outwardly of the pen by removing the handle stops 59. By tripping the lever 45, an animal may be permitted to pass straight through the pen. The rear gate will be locked in its raised position by the wedge lock 31 and will automatically drop to closed position when released by outward movement of the lever to permit it to swing rearwardly of the wedge 31. It will be apparent that as the pen is being moved on the wheels 11, the catch gate will not be used and therefore the sections 41 and 42 thereof can be swung towards closed position to lock the wheels in supporting position.

Many advantages of the described structure have been mentioned and others will be apparent.

Having thus described this invention, what is claimed is:

1. A portable animal holding and sorting pen comprising an elongated enclosure pen formed of upstanding framework walls to permit access to an animal disposed therein and having a rear inlet end and a forward outlet end controlled by selectively operable gates, wheels mounted on said pen for supporting it for movement from place-to-place, said framework walls including side walls disposed between the inlet and outlet ends and having openings controlled by side gates, each of the said side gates having a forward upstanding edge hingedly mounted to the pen and being swingable inwardly to expose the respective opening which it controls and to block forward access through the pen to said outlet end and to direct an animal outwardly and forwardly to the side through said opening.

2. An animal pen according to claim 1 in which said gate at said forward outlet end is a head catch gate for catching and retaining an animal in said pen.

3. An animal pen according to claim 1 in which said inlet gate is a vertically slidable gate.

4. An animal pen according to claim 3 including a hand lever pivoted to the side wall and connected to said gate by a cable arrangement for moving it vertically, and a wedge lock engaging said handle automatically when it moves into gate-raising position.

5. An animal pen according to claim 4 in which each of said side gates is provided with stop means for preventing outward swinging but permitting inward swinging relative to the side wall in which it is mounted, each of said side gates being of sufficient extent to engage the other side gate when swung inwardly and to hold its stop means in engagement.

6. A pen according to claim 5 in which each side gate is positioned between vertical posts and is hinged to one of said posts, said stop means comprising an upstanding handle and stop carried by the gate and spaced from its forward hinged edge and normally engages a portion of the associated side wall at the inner side thereof.

7. A pen according to claim 6 including means for removably mounting said stop handle, said gate being swingable outwardly beyond said side wall when the stop handle is removed.

8. A pen according to claim 6 including a latch on the side gate which engages with a keeper at the outer side of said side wall, and a spring connected to each gate and normally swinging it to a position within the side wall with said stop handle in engagement with said side wall portion.

9. An animal pen according to claim 1 in which said wheels are carried by said pen on brackets pivoted thereto by an off-center pivot so that they normally tend to swing upwardly into nonsupporting position, and means for locking said brackets in lowered position with said wheels in supporting relationship to the pen.

10. An animal pen according to claim 9 in which said forward outlet gate is a catch gate having two opposed sections hingedly mounted by sleeves carried by vertical posts on said pen, said sleeves carrying locking lugs which engage said wheel supporting brackets to hold them in their upper positions with the wheels in pen-supporting position when the gate sections are moved toward animal catching position, said gate having means for retaining said gate sections in said position.

References Cited by the Examiner
UNITED STATES PATENTS

| | | | |
|---|---|---|---|
| 2,050,527 | 8/1936 | Grabe | 119—55 |
| 2,703,554 | 3/1955 | Haggard et al. | 119—99 |
| 2,786,449 | 3/1957 | Daghlerup | 119—99 |
| 2,851,993 | 9/1958 | Hettinger | 119—99 |

SAMUEL KOREN, *Primary Examiner.*

HUGH R. CHAMBLEE, *Examiner.*